United States Patent
Li et al.

(10) Patent No.: US 11,425,089 B2
(45) Date of Patent: *Aug. 23, 2022

(54) METHOD AND SYSTEM FOR NEAR REAL-TIME IP USER MAPPING

(71) Applicant: Beijing DiDi Infinity Technology and Development Co., Ltd., Beijing (CN)

(72) Inventors: Dong Li, Santa Clara, CA (US); Deyu Hu, Palo Alto, CA (US); Jing Chen, Palo Alto, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 271 days.

This patent is subject to a terminal disclaimer.

(21) Appl. No.: 16/711,579

(22) Filed: Dec. 12, 2019

(65) Prior Publication Data

US 2020/0120063 A1     Apr. 16, 2020

Related U.S. Application Data

(63) Continuation of application No. 15/924,575, filed on Mar. 19, 2018, now Pat. No. 10,547,587.

(51) Int. Cl.
*H04L 61/503* (2022.01)
*H04L 61/2557* (2022.01)
*H04L 61/5046* (2022.01)

(52) U.S. Cl.
CPC ........ *H04L 61/203* (2013.01); *H04L 61/2046* (2013.01); *H04L 61/2557* (2013.01)

(58) Field of Classification Search
CPC . H04L 61/25; H04L 29/08144; H04L 61/203; H04L 61/2503; H04L 61/2575

USPC ......................................... 709/225, 226, 227
See application file for complete search history.

(56) References Cited

U.S. PATENT DOCUMENTS

| | | | |
|---|---|---|---|
| 7,360,086 B1 | 4/2008 | Tsuchiya et al. | |
| 7,516,487 B1 * | 4/2009 | Szeto | H04L 63/0263 |
| | | | 726/13 |
| 7,562,390 B1 * | 7/2009 | Kwan | H04L 63/0236 |
| | | | 726/23 |

(Continued)

FOREIGN PATENT DOCUMENTS

WO     2016180865 A1     11/2016

OTHER PUBLICATIONS

PCT International Search Report and the Written Opinion dated Feb. 21, 2019, issued in related International Application No. PCT/US2018/063770 (7 pages).

(Continued)

*Primary Examiner* — Madhu Woolcock
(74) *Attorney, Agent, or Firm* — Sheppard Mullin Richter & Hampton LLP

(57) ABSTRACT

Systems and methods are provided for near real-time IP user mapping. Such methods may include obtaining IP address assignment data points from different sources including an authentication, authorization, and accounting (AAA) server of a private network, a service provider that provides a computer-based service within the private network, and user devices that have access to the private network. The methods may also include applying an IP mapping rule to the obtained IP address assignment data points to generate IP address mapping.

13 Claims, 5 Drawing Sheets

(56) References Cited

U.S. PATENT DOCUMENTS

| | | | |
|---|---|---|---|
| 8,214,899 B2* | 7/2012 | Chien | G06F 21/552 |
| | | | 726/23 |
| 8,804,729 B1 | 8/2014 | Melman et al. | |
| 10,547,587 B2 | 1/2020 | Li et al. | |
| 2004/0122974 A1* | 6/2004 | Murakami | H04L 29/12216 |
| | | | 709/245 |
| 2004/0174904 A1* | 9/2004 | Kim | H04L 29/1232 |
| | | | 370/475 |
| 2004/0213172 A1 | 10/2004 | Myers et al. | |
| 2004/0213260 A1 | 10/2004 | Leung et al. | |
| 2005/0114880 A1 | 5/2005 | Gould | |
| 2005/0207447 A1* | 9/2005 | Sekiguchi | H04L 29/12 |
| | | | 370/475 |
| 2006/0235997 A1 | 10/2006 | Munirajan et al. | |
| 2007/0061462 A1 | 3/2007 | Kim et al. | |
| 2007/0061887 A1* | 3/2007 | Hoover | H04L 45/021 |
| | | | 726/26 |
| 2007/0097992 A1* | 5/2007 | Singh | H04L 29/12216 |
| | | | 370/395.54 |
| 2008/0037536 A1 | 2/2008 | Padmanabhan et al. | |
| 2008/0250498 A1 | 10/2008 | Butti et al. | |
| 2008/0276294 A1 | 11/2008 | Brady | |
| 2009/0138611 A1 | 5/2009 | Miao et al. | |
| 2009/0198800 A1 | 8/2009 | Dighe et al. | |
| 2009/0307371 A1* | 12/2009 | Okazaki | H04L 61/103 |
| | | | 709/233 |
| 2010/0008235 A1* | 1/2010 | Tinnakornsrisuphap | H04L 29/12264 |
| | | | 370/241 |
| 2010/0253974 A1 | 10/2010 | Hamada | |
| 2010/0274924 A1 | 10/2010 | Allan et al. | |
| 2011/0029645 A1* | 2/2011 | Baykal | H04L 61/2046 |
| | | | 709/221 |
| 2011/0055928 A1 | 3/2011 | Brindza | |
| 2012/0224576 A1 | 9/2012 | Gu et al. | |
| 2012/0317252 A1* | 12/2012 | Vemulapalli | H04L 61/2592 |
| | | | 709/221 |
| 2013/0067062 A1* | 3/2013 | Gaitonde | H04L 63/12 |
| | | | 709/224 |
| 2013/0166737 A1 | 6/2013 | Christenson et al. | |
| 2013/0275588 A1 | 10/2013 | Li et al. | |
| 2014/0089491 A1 | 3/2014 | Nadler et al. | |
| 2014/0325651 A1 | 10/2014 | Kim et al. | |
| 2015/0071225 A1 | 3/2015 | Krishna et al. | |
| 2015/0281947 A1 | 10/2015 | Patil et al. | |
| 2016/0234162 A1* | 8/2016 | Sabet | H04L 41/0873 |
| 2017/0063680 A1 | 3/2017 | Deng | |
| 2017/0230403 A1 | 8/2017 | Kennedy et al. | |
| 2018/0077113 A1* | 3/2018 | Shie | H04L 61/2015 |
| 2019/0020679 A1 | 1/2019 | Qu et al. | |

OTHER PUBLICATIONS

Non-Final Office Action dated Aug. 7, 2019, issued in related U.S. Appl. No. 15/924,575 (29 pages).

* cited by examiner

METHOD AND SYSTEM FOR NEAR REAL-TIME IP USER MAPPING

CROSS REFERENCE TO RELATED APPLICATION

This application is a continuation of U.S. patent application Ser. No. 15/924,575, filed on Mar. 19, 2018, which is hereby incorporated by reference in its entirety.

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This disclosure generally relates to methods and systems for near real-time IP user mapping.

BACKGROUND

In a network environment, such as a private network environment of an enterprise, a campus, a government entity, and so on, IP addresses are dynamically assigned to end users to efficiently use IP address resources. For example, an IP address assigned to a first end user can be reassigned to a second end user upon non-use of network by the first end user. For an administrator of a network environment (e.g., a private network environment), it is important to track which IP address is assigned to which user or user devices at a certain point in time to know activities of users and/or user devices mainly for security reasons, such as detection of internal threat, operation violations, and so on. Conventionally, there are some sources that can provide information regarding assignment of IP addresses to end users and user devices, such as an authentication, authorization, and accounting (AAA) server that manages user connection to a network environment. It is desired to create a more complete IP address assignment mapping to enable more complete administrative monitoring of user activities.

SUMMARY

Various embodiments of the present disclosure can include systems, methods, and non-transitory computer readable media for near real-time IP user mapping. A method for near real-time IP user mapping may include obtaining first IP address assignment data points from an authentication, authorization, and accounting (AAA) server of a private network, obtaining second IP address assignment data points from a service provider that provides a computer-based service within the private network, obtaining third IP address assignment data points from user devices that have access to the private network, and applying an IP mapping rule to the obtained first, second, and third IP address assignment data points to generate IP address mapping.

In some embodiments, each data point of the first, second, and third IP address assignment data points indicates a correspondence between an IP address and a user identifier at a point in time, and the IP address mapping includes one or more user identifiers assigned with an IP address at different points in time with respect to each of one or more IP addresses.

In some embodiments, the applying an IP mapping rule includes determining whether or not a conflict of data points exists among the first, second, and third IP address assignment data points, and dropping one or more of conflicting data points, wherein the IP address mapping is generated based on non-dropped data points of the first, second, and third IP address assignment data points.

In some embodiments, a conflict of data points is determined to exist when: i) a point in time indicated by a first one of the first, second, and third IP address assignment data points is within a predetermined period of time from a point in time indicated by a second one of the first, second, and third IP address assignment data points, and ii) an IP address indicated by the first one is different from an IP address indicated by the second one.

In some embodiments, when a first IP address assignment data point is conflict with a second IP address assignment data point, the second IP address assignment data point is dropped. In some embodiments, when a second IP address assignment data point is conflict with a third IP address assignment data point, the third IP address assignment data point is dropped. In some embodiments, when a first IP address assignment data point is conflict with a third IP address assignment data point, the third IP address assignment data point is dropped.

In some embodiments, the user identifier includes a user ID of a user using a user device. In some embodiments, the user identifier includes a user device identifier of a user device.

In some embodiments, the method further includes presenting a graphical user interface (GUI) indicating the generated IP address mapping.

In some embodiments, a computing system includes one or more processors, and a memory storing instructions, when executed by the one or more processors, cause the computing system to perform one or more of the above method.

In some embodiments, a computer system includes an authentication, authorization, and accounting (AAA) server for a network, a service provider configured to provide a computer-based service within the network, a plurality of user devices configured to access the network, and an IP mapping server configured to perform one or more of the above method.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Various embodiments of the present disclosure include systems, methods, and non-transitory computer readable media for near real-time IP user mapping, which can be suitably applied to monitoring of user access from an internal network, are described.

According to various embodiments of the present disclosure, IP address assignment data points are obtained from multiple sources, including an authentication, authorization, and accounting (AAA) server of a private network, a service provider that provides a computer-based service within the private network, and user devices that have access to the private network, and then an IP mapping rule is applied to the obtained IP address assignment data points to generate IP address mapping. In some cases, a conflict may occur among multiple IP address assignment data points when points in time indicated by the multiple IP address assignment data point are sufficiently close but IP addresses indicated thereby are different. To solve this issue, the IP mapping rule prioritize one of the conflicting IP address assignment data points based on the sources from which the IP address assignment data points are obtained.

Figure 1:
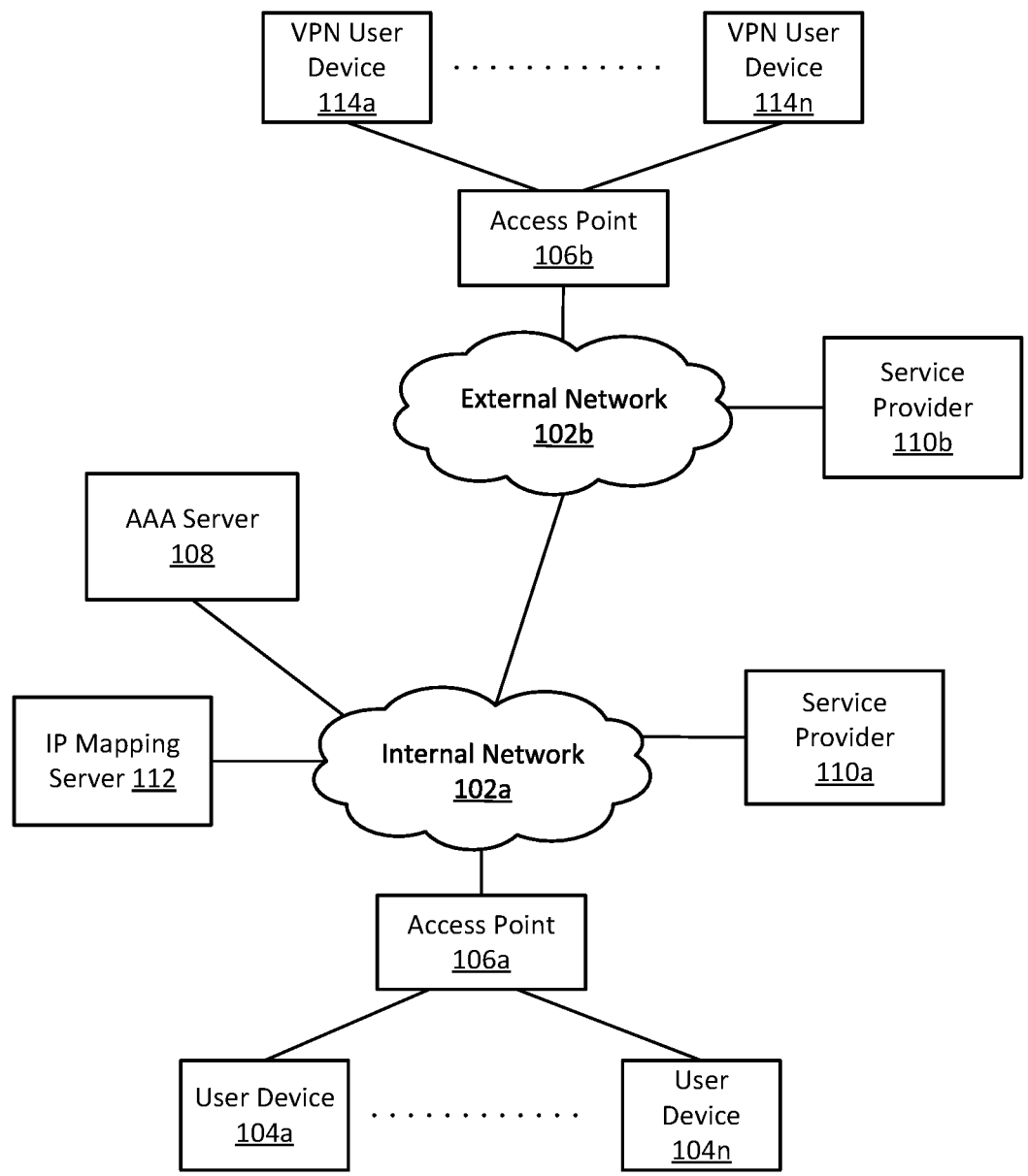
FIG. 1 illustrates an example of a network architecture for carrying out near real-time IP user mapping according to some embodiments.

FIG. 1 illustrates an example of a network architecture 100 for carrying out near real-time IP user mapping according to some embodiments. In the example of FIG. 1, the network architecture 100 includes user devices 104a-104n (collectively referred to as user devices 104), an access point 106a, an authentication, authorization, and accounting (AAA) server 108, a service provider 110a, and an IP mapping server 112 connected via an internal network 102a, and a service provider 110b, VPN user devices 114a-114n (collectively referred to as VPN user devices 114), an access point 106b connected via an external network 102b.

In the example of the network architecture 100 shown in FIG. 1, the internal network 102a is intended to represent a computer network of wired communication and/or wireless communication in a limited region, such as enterprises, campuses, government entities. In some embodiments, the internal network 102a includes any one or more of, for instance, an intranet, a LAN (Local Area Network), a PAN (Personal Area Network), a SAN (Storage Area Network), and/or other network.

In the example of the network architecture 100 shown in FIG. 1, the external network 102b is intended to represent a computer network of wired communication and/or wireless communication in a public region. In some embodiments, the external network 102b includes any one or more of, for instance, the Internet, a WAN (Wide Area Network), a MAN (Metropolitan Area Network), a cellular communications network, a Public Switched Telephone Network, and/or other network. In some embodiments, the wireless communication includes one or more of long-range wireless communication based on GSM, W-CDMA and/or CDMA2000 (3G), IEEE 802.16 (e.g., WiMAX, 4G LTE, etc.), IEEE 802.11 (e.g., WiFi, 5G), and so on.

In the example of the network architecture 100 shown in FIG. 1, the user devices 104 are intended to represent computing devices owned and/or operated by users and connected to the internal network 102a. In some embodiments, one or more of the user devices 104 is configured as a personal computer (e.g., a desktop computer, a laptop computer, etc.), a smartphone, a tablet computing device, a wearable device, a gaming console, a handheld gaming device, and/or other device that can be programmed to disable user-originated communication using the user devices 104.

In the example of the network architecture 100 shown in FIG. 1, the VPN user devices 114 are intended to represent computing devices owned and/or operated by users and connected to the internal network 102a from the external network 102b via a virtual private network (VPN) connection using IP addresses assigned by the AAA server 108 for the VPN connection. In some embodiments, one or more of the VPN user devices 114 is configured in the similar or the same manner as the user devices 104.

Figure 5:
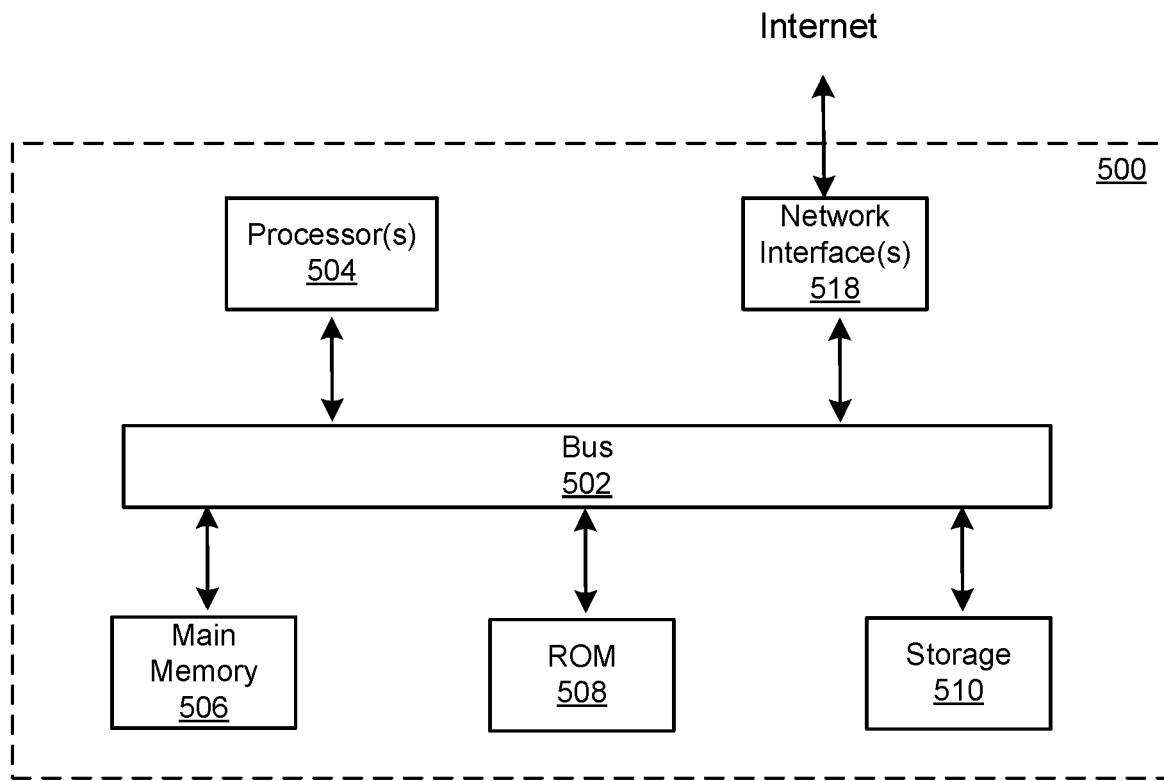
FIG. 5 illustrates a block diagram of an example computer system in which any of the embodiments described herein may be implemented.

In some embodiments, one or more of the user devices 104 and/or one or more of the VPN user devices 114 includes one or more processors, one or more storage devices, and/or other components. In some embodiments, the processors are programmed by one or more computer program instructions stored on the storage device. As used herein, for convenience, the various applicable instruction modules will be described as performing an operation, when, in fact, various applicable instructions program the processors (and therefore user device 104) to perform the various applicable operations. Further details and features of a user device 104 may be understood with respect to a computer system 500 as illustrated in FIG. 5.

In some embodiments, one or more of the user devices 104 and/or one or more of the VPN user devices 114 includes a computer program instruction (e.g., agent) configured to generate IP address assignment data points (which can be referred to as "third IP address assignment data points") based on the assigned (reassigned) IP addresses and user identifiers (e.g., user name and/or device identifier such as MAC address) to which the IP addresses are assigned. For example, an IP address assignment data point includes an IP address and a user identifier to which the IP address has been assigned, and a point in time (e.g., timestamp) at which the IP address has been assigned to a user of the user identifier. In some embodiments, the computer program instruction is also configured to send the address assignment data points (third IP address assignment data points) to the IP mapping server 112 based on pull requests from the IP mapping server 112 and/or push notifications from the user device periodically (e.g., every few minutes).

In the example of the network architecture 100 shown in FIG. 1, the access points 106a and 106b are intended to represent a wired and/or wireless network device for connection of devices to the internal network 102a and the external network 102b, respectively. In some implementations, the access point 106a is connected between user devices 104 and the internal network 102a, and the access point 106b is connected between the VPN user devices 114 and the external network 102b. In some embodiments, the access points 106a and/or 106b are configured to report a connection status of a user device connected thereto to the AAA server. In a specific implementation, the connection status may include a connected status where a user device is actively connected to a network (e.g., the internal network 102a, the external network 102b) for data communication internally or externally, and a disconnected status where the user device is not actively connected to the network (e.g., powered off, crushed, etc.). In a specific implementation, the access points 106a and/or 106b report the connection status periodically (e.g., every 5 minutes) as heartbeat signals, or upon detecting change of the connection status (e.g., from the connected status to the disconnected status). In a specific implementation, the access points 106a and/or 106b report a time up of using an IP address when a time period during which a single user device uses an IP address reached a certain period of time (e.g., few hours), such that the IP address is reassigned to a different user device.

In the example of the network architecture 100 shown in FIG. 1, the AAA server 108 is intended to represent a network server that manages connection of user devices 104 and/or the VPN user devices 114 to the internal network 102a. An example of the AAA server 108 includes a remote authentication dial in user service (RADIUS) server (e.g., Cisco ACS). In some embodiments, the AAA server 108 authenticates a user device and/or a user using a user device based on a device identifier, a user identifier (e.g., user name), and so on, authorizes access to the internal network 102a based on a device credential, a user credential, and so on, and records logs of status of a user device. In some embodiments, the AAA server 108 assigns IP addresses (e.g., based on IPv4 and/or IPv6) to authorized user devices 104 within the internal network 102a. In some embodiments, the AAA server 108 also dynamically reassigns IP addresses to different authorized user devices 104 depending on various reasons, such as reception of a report from the access point 106a indicating a disconnected status of a user device, so that an address space allocated to the internal network 102a can be more efficiently used by users. In some embodiments, the AAA server 108 is configured by an entity (e.g., network service provider) different from a user entity that uses and manages the internal network 102a, and some functionalities of the AAA server 108 may not be reconfigurable by the user entity.

In some embodiments, the AAA server 108 is configured to generate IP address assignment data points (first IP address assignment data points) based on the assigned (reassigned) IP addresses and user identifiers (e.g., user name and/or device identifier such as MAC address) to which the IP addresses are assigned. Depending on a specific implementation, the first IP address assignment data points may include the similar or the same type of data. In a specific implementation, the AAA server 108 generates an IP address assignment data point in response to a connection status of a user device from the access point 106a. In some embodiments, the AAA server 108 is further configured to send the generated IP address assignment data points to the IP mapping server 112. In a specific implementation, the AAA server 108 sends an IP address assignment data point in response to generation of the IP address assignment data point as heartbeat signals.

In the example of the network architecture 100 shown in FIG. 1, the service provider 110a and/or 110b are intended to represent servers configured to provide computer-based service, such as infrastructure service for providing cloud computer resources, platform service for providing cloud computer platforms (e.g., virtual machine), and application service for providing cloud application (e.g., web-based information resource, such as internal wiki sites, git access, and so on). The service provider 110a is connected to the internal network 102a and configured to provide service within the internal network 102a, whereas the service provider 110b is connected to the external network 102b and configured to provide service within and outside the internal network 102a.

In some embodiments, the service provider 110a and/or 110b are configured to record an IP address and a user identifier of a user assigned with the IP address, when the user accesses the service provider for using service, and generate IP address assignment data points (which can be referred to as "second IP address assignment data points") based on the assigned (reassigned) IP addresses and user identifiers to which the IP addresses are assigned, in response to the recording of the IP address. In some embodiments, the service provider 110a and/or 110b are further configured to send the generated IP address assignment data points to the IP mapping server 112. In a specific implementation, the service provider 110a and/or 110b send an IP address assignment data point in response to generation of the IP address assignment data point or upon requests from the IP mapping server 112. In a specific implementation, the service provider 110b sends the IP address assignment data point upon requests from the IP mapping server 112 and/or the internal network 102a having authority to receive the IP address assignment data point from the service provider 110b.

In the example of the network architecture 100 shown in FIG. 1, the IP mapping server 112 is intended to represent a server configured to receive IP address assignment data points from the AAA server 108, the service provider 110a and/or 110b, and the user devices 104 (and the VPN user devices 114), and generate IP address mapping. In a specific implementation, the generated IP address mapping is configured as a searchable database including a plurality of entries, each of which corresponds to an IP address and includes one or more subperiods (e.g., start time and end time) during which a specific user identified by a user name and/or a specific user device identified by a device identifier (e.g., MAC address) is assigned with the IP address. In a specific implementation, the IP mapping server 112 is configured to generate graphical user interface (GUI) data for presenting a searching GUI, and an IP address mapping GUI based on a search result of the searchable database using a search key (e.g., IP address) input through the searching GUI. In a specific implementation, an administrator of the internal network 102a can obtain an IP address mapping of an IP address using the searchable database for conducting activity inspection of one or more users who has used the IP address.

In some embodiments, the IP mapping server 112 is configured to generate the IP address mapping in a near real-time manner. The "near real-time" here means that IP address mapping of a certain point in time is obtained virtually immediately with only a short time lag for processing after an IP address assignment data point is obtained. To achieve the near real-time IP address mapping, in some embodiments, the IP mapping server 112 causes the AAA server 108, the service provider 110a and/or 110b, and the user devices 104 (and the VPN user devices 114) periodically (e.g., every few minutes) to send IP address assignment data points upon generation thereof, for example, by sending pull requests for the IP address assignment data points periodically and/or instructing to send the IP address assignment data points periodically. To achieve the near real-time IP address mapping, in some embodiments, the IP mapping server 112 generates (and updates) the IP address mapping upon reception of the IP address assignment data points. A detailed configuration to achieve the near real-time IP address mapping will be described below with reference to FIG. 2.

Figure 2:
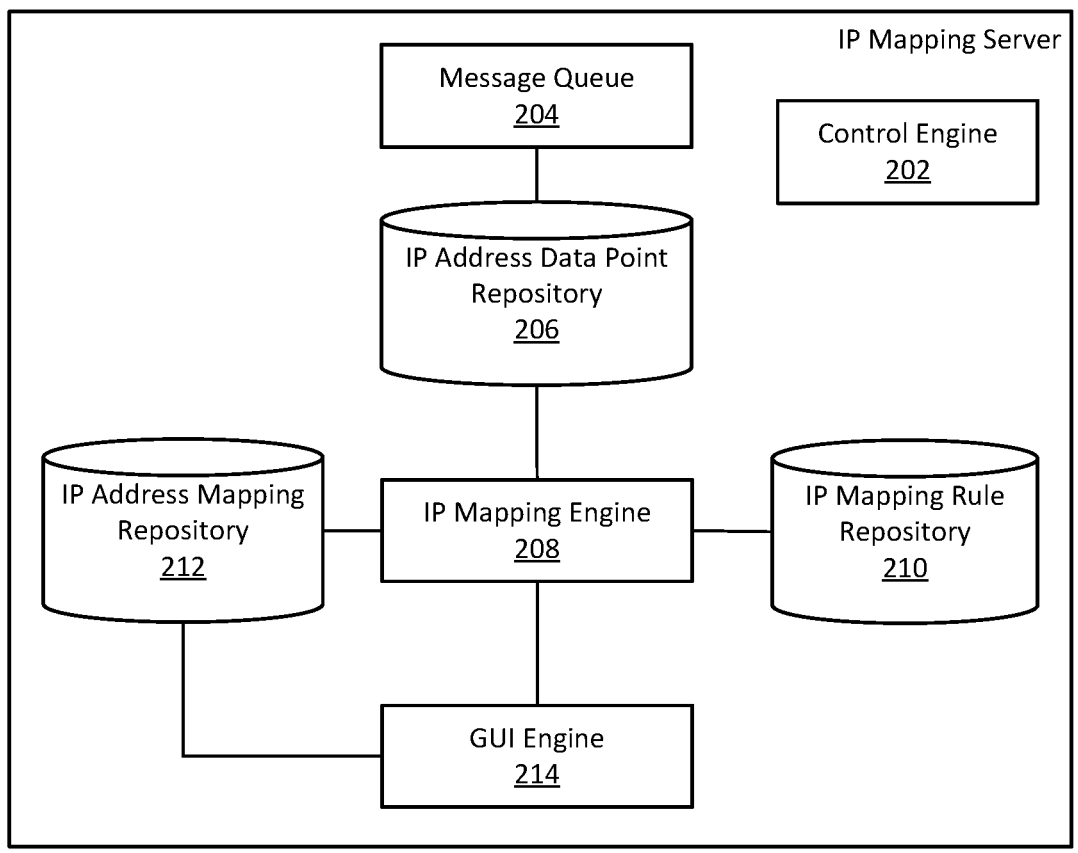
FIG. 2 illustrates an example of a detailed configuration of an IP mapping server according to some embodiments.

FIG. 2 illustrates an example of a detailed configuration 200 of an IP mapping server according to some embodiments. In the example of FIG. 2, the IP mapping server includes a control engine 202, a message queue 204, an IP address data point repository 206, an IP mapping engine 208, an IP mapping rule repository 210, an IP address mapping repository 212, and a GUI engine 214. Although not depicted in FIG. 2, the control engine 202 may be coupled to the message queue 204, the IP address data point repository 206, the IP mapping engine 208, the IP mapping rule repository 210, the IP address mapping repository 212, and/or the GUI engine 214.

In the example depicted in FIG. 2, the control engine 202 is intended to represent specifically purposed hardware and software configured to control overall operation of the IP mapping server. In the example depicted in FIG. 2, the control engine 202 is configured to carry out operations based on an application instruction stored in a non-transitory computer readable medium, which is for example stored in datastore of the IP mapping server (e.g., the IP mapping rule repository 210). In some embodiments, the control engine 202 is configured to cause a request for IP address assignment data points to be sent periodically to applicable destinations such as the AAA server 108, the service providers 110a and 110b, and the user devices 104 (VPN user devices 114) in FIG. 1. In some embodiments, the control engine 202 is configured to cause an instruction to send IP address assignment data points to be sent to the applicable destinations.

In the example depicted in FIG. 2, the message queue 204 is intended to represent specifically purposed hardware and software configured to receive IP address assignment data points from applicable sources such as the AAA server 108, the service providers 110a and 110b, and the user devices 104 (VPN user devices 114 in FIG. 1), and forward the received IP address assignment data points from applicable sources to the IP address data point repository 206 coupled thereto for being stored therein. Depending on a specific implementation, the message queue 204 includes multiple queues for different types of sources. For example, the message queue 204 includes a first queue for a source of a first type (e.g., the AAA server 108 in FIG. 1), a second queue for a source of a second type (e.g., the service providers 110a and/or 110b in FIG. 1), and a third queue for a source of a third type (e.g., the user devices 104 and/or the VPN user devices 114 in FIG. 1). Depending on a specific implementation, the message queue 204 deques (i.e., forwards) IP address assignment data points from the queues thereof in applicable manner (e.g., FIFO or in an descending order of timestamp).

In the example depicted in FIG. 2, the IP address data point repository 206 is intended to represent specifically purposed datastore configured to store IP address assignment data points therein. In some embodiments, when the IP address data point repository 206 is full in stored data, the control engine 202 causes a part of data stored in the IP address data point repository 206 to be overwritten with new data to be stored. The data to be overwritten may be selected based on various applicable algorithm. For example, with respect to IP address assignment data points of a specific IP address, an oldest IP address assignment data point may be selected with priority over newer data points. In another example, IP address assignment data points of IP addresses outside an internal network (e.g., the internal network 102a in FIG. 1) may be selected with priority over IP address assignment data points of IP addresses within the internal network.

In the example depicted in FIG. 2, the IP mapping engine 208 is intended to represent specifically purposed hardware and software configured to generate near real-time IP address mapping based on IP address assignment data points stored in the IP address data point repository 206 coupled thereto. In generating the near real-time IP address mapping, in some embodiments, the IP mapping engine 208 determines whether or not there is a conflict of IP address assignment data points in accordance with an IP address mapping rule stored in the IP mapping rule repository 210 coupled thereto, in particular, a conflict criteria of the IP address mapping rule. In some embodiments, a conflict of IP address assignment data points is determined to occur when a point in time indicated by an IP address assignment data point for an IP address is within a predetermined period (e.g., back to 10 min) of another point in time indicated by another IP address assignment data point for the IP address, and user identifiers (e.g., user name and/or device identifier) indicated by these IP address assignment data points are different from each other. Such a conflict may occur when a timestamp of an IP address assignment data point is not collect or not properly synchronized with IP address assignment data points from other sources, when a user improperly disguises its IP address, for example, for malicious purpose, and so on. In general, timestamp of an IP address assignment data point is less reliable as a stratum in a network time protocol (NTP) goes down to a lower level, and usually end users have less reliable timestamps compared to an AAA server and service providers, which have more correctly NTP-synchronized timestamps. Depending on the specific implementation, the conflict criteria may indicate the predetermined period and/or a formula to calculate the extending-back period for determining existence of conflicts.

In generating the near real-time IP address mapping, in some embodiments, the IP mapping engine 208 solves a conflict of IP address assignment data points by dropping one or more of the conflicting IP address assignment data points in accordance with the IP address mapping rule, in particular, a priority criteria thereof. Depending on a specific implementation, the priority criteria indicates a rule of priority among IP address assignment data points from different sources, for example, based on reliability of sources. For example, the priority criteria indicates that an IP address assignment data point from an AAA server (e.g., the AAA server 108 in FIG. 1) is prioritized over IP address assignment data points from a service provider (e.g., the service provider 110a and/or 110b in FIG. 1), when IP address assignment data points from the AAA server is considered more reliable. In another example, the priority criteria indicates that an IP address assignment data point from an AAA server (e.g., the AAA server 108 in FIG. 1) is prioritized over IP address assignment data points from user devices (e.g., the user devices 104 and/or VPN user devices 114 in FIG. 1), when IP address assignment data points from the AAA server is considered more reliable. In another example, the priority criteria indicates that an IP address assignment data point from a service provider (e.g., the service provider 110a and/or 110b in FIG. 1) is prioritized over IP address assignment data points from user devices (e.g., the user devices 104 and/or VPN user devices 114 in FIG. 1), when IP address assignment data points from the service provider is considered more reliable. In another example, the priority criteria indicates that an IP address assignment data point from an internal service provider (e.g., the service provider 110a in FIG. 1) is prioritized over IP address assignment data points from external service providers (e.g., the service provider 110b in FIG. 1), when IP address assignment data points from the internal service provider is considered more reliable.

In generating the near real-time IP address mapping, in some embodiments, the IP mapping engine 208 generates the IP address mapping based on IP address assignment data points that have not been dropped (non-dropped IP address assignment data points) in accordance with the IP address mapping rule. Depending on a specific implementation, the IP address mapping rule indicates that an IP address has been assigned to a user (user device) identified by a user name (device identifier) included in a non-dropped IP address assignment data point corresponding to the IP address from a point in time (timestamp) indicated thereby back to a closer one of a predetermined period of time (e.g., 10 min) and a previous point in time (timestamp) indicated by another non-dropped IP address assignment data point. For example, it is assumed that with respect to an IP address, there are first, second, and third non-dropped IP address assignment data points at 15:11:00, 15:16:00 and 15:29:00, respectively, on the same day between 15:00:00 and 15:30:00. In this case, the IP address mapping rule may indicate that during a time period from 15:01:00 to 15:11:00, the IP address assignment is mapped based on the first non-dropped IP address assignment data point; during a time period from 15:11:00 to 15:16:00, the IP address assignment is mapped based on the second non-dropped IP address assignment data point, and during a time period from 15:19:00 to 15:29:00, the IP address assignment is mapped based on the third non-dropped IP address assignment data point. In this example, no IP address mapping exists during a time period from 15:00:00 to 15:01:00 and a time period from 15:16:00 to 15:19:00. In some embodiments, the IP address mapping rule instructs not to fill the gap of the no IP address mapping period by speculation, in order to provide reliable IP address mapping.

It is noted here that the IP address mapping rule does not specify that an IP address has been assigned to a user (user device) identified by a user name (device identifier) included in a non-dropped IP address assignment data point corresponding to the IP address from a point in time (timestamp) indicated thereby to a future point in time. This is because a fact that assignment of an IP address to a user at a point in time does not show that the IP assigned to the user at a future point in time.

In some embodiments, the IP mapping engine 208 stores generated IP address mapping in the IP address mapping repository 212 coupled thereto as a searchable database. Depending on a specific implementation, the searchable database includes a plurality of entries, each of which corresponds to an IP address and includes one or more subperiods (e.g., start time and end time) during which a specific user identified by a user name and/or a specific user device identified by a device identifier (e.g., MAC address) are assigned with the IP address. These entries of database can show IP address assignment history of an IP address (to whom the IP address has been assigned). Depending on a specific implementation, the searchable database includes a plurality of entries, each of which corresponds to a user name and includes one or more subperiods (e.g., start time and end time) during which a specific IP address has been assigned to the user name. These entries of database can show IP address assignment history of a user name (what IP address(es) have assigned to the user name). Depending on a specific implementation, the searchable database includes a plurality of entries, each of which corresponds to a device identifier and includes one or more subperiods (e.g., start time and end time) during which a specific IP address has been assigned to the device identifier. These entries of database can show IP address assignment history of a device identifier (what IP address(es) have been assigned to the device identifier).

In the example depicted in FIG. 2, the GUI engine 212 is intended to represent specifically purposed hardware and software configured to generate graphical user interface (GUI) data for presenting a searching GUI and an IP address mapping GUI. In some embodiments, a searching GUI is configured to allow user input of one or more search criteria (e.g., IP address, time period, user name, device identifier, etc.) to view an IP address mapping, and an example of a detailed structure of a searching GUI is described below with reference to FIG. 4. In some embodiments, the GUI engine 212 searches, from the IP address mapping repository 212 coupled thereto, IP address assignment data points that match one or more search criteria, and generates an IP address mapping GUI based on the matching IP address assignment data points. For example, an IP address mapping GUI includes a time table (or chart) including one or more time slots during which an IP address has been assigned, in association with assigned user names and/or assigned device identifiers. Depending on a specific implementation, the GUI data is transmitted from the IP mapping server to a user device having an administrative authority such that an administrator can view a searching GUI to input search criteria, and an IP address mapping GUI to view IP address mapping.

As is understood by skilled artisans in the relevant computer and Internet-related arts, each functional component (e.g., engine, module, or repository) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 2 is exemplified with reference to FIG. 4.

Advantageously, according to a near real-time IP user mapping according to some embodiments, IP address assignment data points are collected from multiple sources, including an AAA server, service providers, and user devices. Since IP address assignment of missing points in time can be compensated with each other, more complete IP address mapping can be obtained. Further, a near real-time IP user mapping according to some embodiments, when a conflict of IP address assignment occurs among IP address assignment data points, the conflict is solved based on a conflict solving technique by dropping one or more of the conflicting IP address assignment data points. Moreover, when a conflict of IP address assignment is solved, one or more IP address assignment data points to be dropped is determined based on a type of source from which IP address assignment data points are obtained. Since IP address assignment data points from less reliable source are dropped, more reliable IP address mapping can be obtained.

Figure 3:
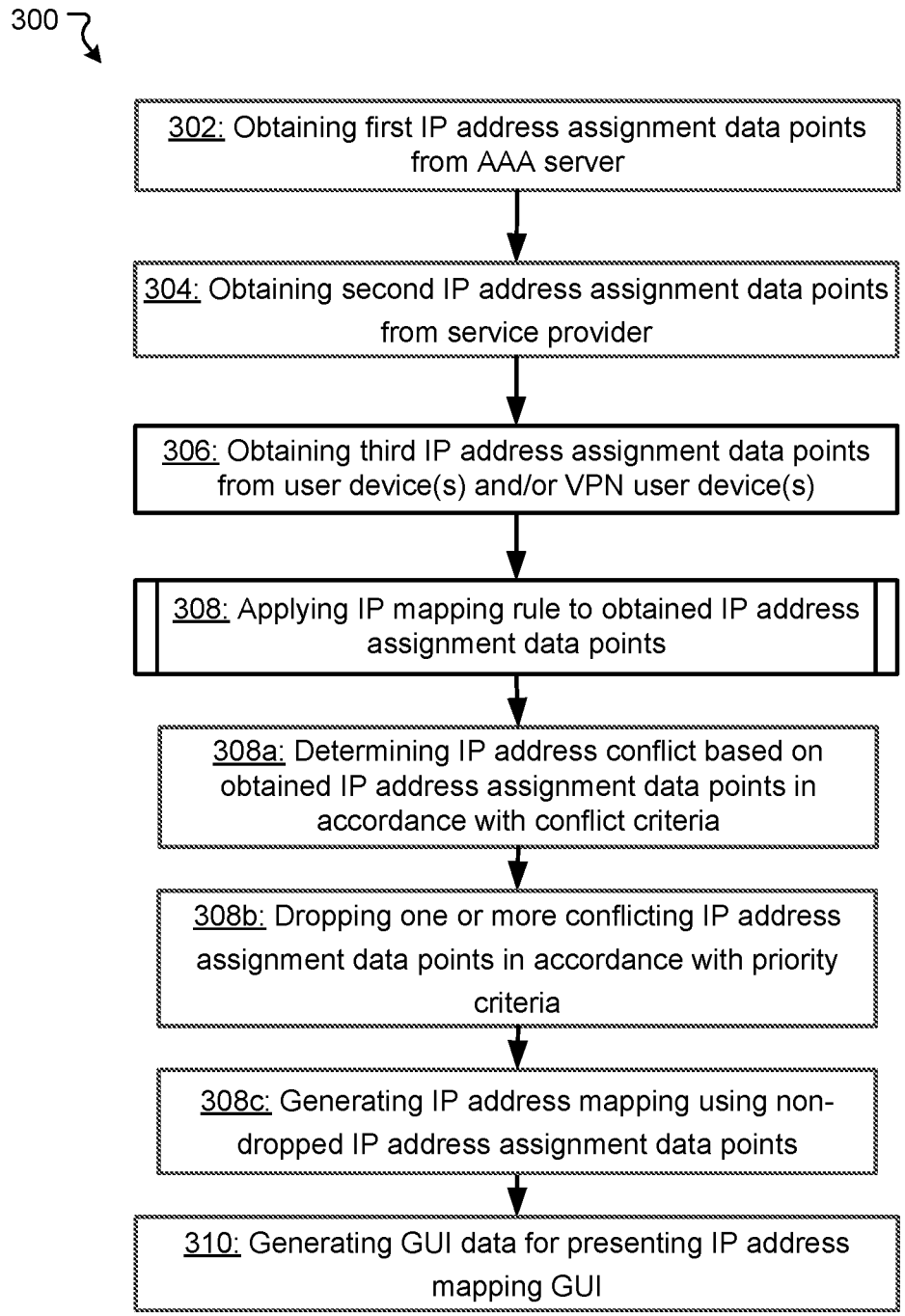
FIG. 3 illustrates a flowchart of an example method for carrying out near real-time IP user mapping according to some embodiments.

FIG. 3 illustrates a flowchart of an exemplary method 300 for carrying out near real-time IP user mapping according to some embodiments. This flowchart illustrates modules (and potentially decision points) organized in a fashion that is conducive to understanding. It should be recognized, however, that the modules can be reorganized for parallel execution, reordered, modified (changed, removed, or augmented), where circumstances permit. The method 300 may be implemented in various environments including, for example, the IP mapping server 110 of FIG. 1 and/or the components of the IP mapping server of FIG. 2. The exemplary method 300 may be implemented by multiple systems similar to the IP mapping server. The operations of method 300 presented below are intended to be illustrative.

In step 302 of FIG. 3, IP address assignment data points (which can be referred to as "first IP address assignment data points") are obtained from an AAA server (the AAA server 108 in FIG. 1). An applicable module for receiving IP address assignment data points, such as the message queue 204 in FIG. 2 receives the first IP address assignment data points from the AAA server, and an applicable module for storing IP address assignment data points, such as the IP address data point repository 206 in FIG. 2 stores the received first IP address assignment data points. In some embodiments, each of the first IP address assignment data points is obtained from the AAA server upon generation thereof, such that near real-time IP user mapping is achieved.

In step 304 of FIG. 3, IP address assignment data points (second IP address assignment data points) are obtained from one or more service providers (e.g., the service provider 110a and/or 110b in FIG. 1). An applicable module for receiving IP address assignment data points, such as the message queue 204 in FIG. 2 receives the second IP address assignment data points from the one or more service providers, and an applicable module for storing IP address assignment data points, such as the IP address data point repository 206 in FIG. 2 stores the received second IP address assignment data points. Similarly to the first IP address assignment data points, in some embodiments, each of the second IP address assignment data points is obtained from the one or more service providers upon generation thereof, such that near real-time IP user mapping is achieved.

In step 306 of FIG. 3, IP address assignment data points (third IP address assignment data points) are obtained from user devices (e.g., the user devices 104 and/or VPN user devices 114 in FIG. 1), in particular, installed agents of the user devices that report assigned IP addresses. An applicable module for receiving IP address assignment data points, such as the message queue 204 in FIG. 2 receives the third IP address assignment data points from the user devices, and an applicable module for storing IP address assignment data points, such as the IP address data point repository 206 in FIG. 2 stores the received third IP address assignment data points. Similarly to the first and second IP address assignment data points, in some embodiments, each of the third IP address assignment data points is obtained from the user devices upon generation thereof, such that near real-time IP user mapping is achieved.

In step 308 of FIG. 3, an IP mapping rule is applied to the obtained first, second, and third IP address assignment data points, to generate IP address mapping. An applicable module for retrieving obtained IP address assignment data points, such as the IP mapping engine 208 in FIG. 2, retrieves the obtained IP address assignment data points from an applicable module such as the IP address data point repository 206 in FIG. 2. An applicable module for retrieving an IP mapping rule, such as the IP mapping engine 208 in FIG. 2, retrieves the IP mapping rule from an applicable module such as the IP mapping rule repository 210 in FIG. 2. Further, an applicable module for applying the IP mapping rule, such as the IP mapping engine 208 in FIG. 2, applies the retrieved IP mapping rule to the retrieved IP address assignment data points. For the application of the IP mapping rule to the IP address assignment data points, sub-steps 308a-308c are carried out.

In sub-step 308a of FIG. 3, whether or not there is conflicts among IP address assignment data points is determined in accordance with conflict criteria of the IP mapping rule. In some implementation, a conflict is determined to occur among multiple IP address assignment data points when points in time indicated by the multiple IP address assignment data point are sufficiently close (e.g., within 1 min) but IP addresses indicated thereby are different. For example, when first IP address assignment data point A indicates an assignment of a specific IP address to user name X at 19:00:00 on Jan. 1, 2018, and third IP address assignment data point B indicates an assignment of the specific IP address to user name Y at 19:01:00 on Jan. 1, 2018, it is determined that a conflict occurred. Depending on a specific implementation, proximity of the points in time to determine the conflict is specified in the conflict criteria of the IP mapping rule.

In sub-step 308b of FIG. 3, one or more conflicting IP address data points are dropped in accordance with priority criteria of the IP mapping rule. In some implementation, the priority criteria specifies that when there is a conflict between a first IP address assignment data point and a second IP address assignment data point, the second IP address assignment data point is selectively dropped (and the first IP address assignment data point is not dropped), as the first IP address assignment data point is considered to be more reliable. In some implementation, the priority criteria specifies that when there is a conflict between a second IP address assignment data point and a third IP address assignment data point, the third IP address assignment data point is selectively dropped (and the second IP address assignment data point is not dropped), as the second IP address assignment data point is considered to be more reliable. In some implementation, the priority criteria specifies that when there is a conflict between a first IP address assignment data point and a third IP address assignment data point, the third IP address assignment data point is selectively dropped (and the first IP address assignment data point is not dropped), as the first IP address assignment data point is considered to be more reliable. In some implementation, the priority criteria specifies that when there is a conflict between a second IP address assignment data point (e.g., from a service provider A) and another second IP address assignment data point (e.g., from a service provider B), both of the second IP address assignment data points are dropped, as both are considered to be unreliable equally. In some implementation, the priority criteria specifies that when there is a conflict between a third IP address assignment data point (e.g., from a user device A) and another third IP address assignment data point (e.g., from a user device B), both of the third IP address assignment data points are dropped, as both are considered to be unreliable equally. It is also noted that, in general, a conflict does not occur between multiple first IP address assignment data points, because first IP address assignment data points are generated by an AAA server that assigns IP addresses on its own.

In sub-step 308c of FIG. 3, IP address mapping is generated and/or updated using non-dropped IP address assignment data points. In some implementation, an IP address mapping indicates, with respect to each of a plurality of IP addresses, one or more subperiods during which the IP address has been assigned to users and/or user devices along with identifiers of the users and/or user devices. The generated IP address mapping is stored in an applicable module such as the IP address mapping repository 212 in FIG. 2. In some implementation, to achieve near real-time IP user mapping, the IP address mapping is repeatedly generated and/or updated upon new IP address assignment data point being obtained through either one of steps 302, 304, and 306.

In step 310 of FIG. 3, GUI data for presenting an IP address mapping GUI is generated. An applicable module for retrieving IP address mapping, such as the GUI engine 214 in FIG. 2, retrieves the IP address mapping from applicable datastore such as the IP address mapping repository 212 in FIG. 2. An applicable module for generating GUI data, such as the GUI engine 214 in FIG. 2, generates the GUI data. In some implementations, the GUI data is generated upon one or more search criteria are received from an applicable device such as an administrator's device.

The flow chart in FIG. 3 can also represent software modules, which when executed by a processor, perform the steps or functions. For example, the block denoted by reference numeral 302 can represent a software module, which, when executed by a processor, performs the step or function of obtaining first IP address assignment data points. Similarly, the other blocks can be software modules for performing the respective steps/functions. The software modules can be stored in a computer readable medium, e.g., a non-transitory computer readable medium.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 4:
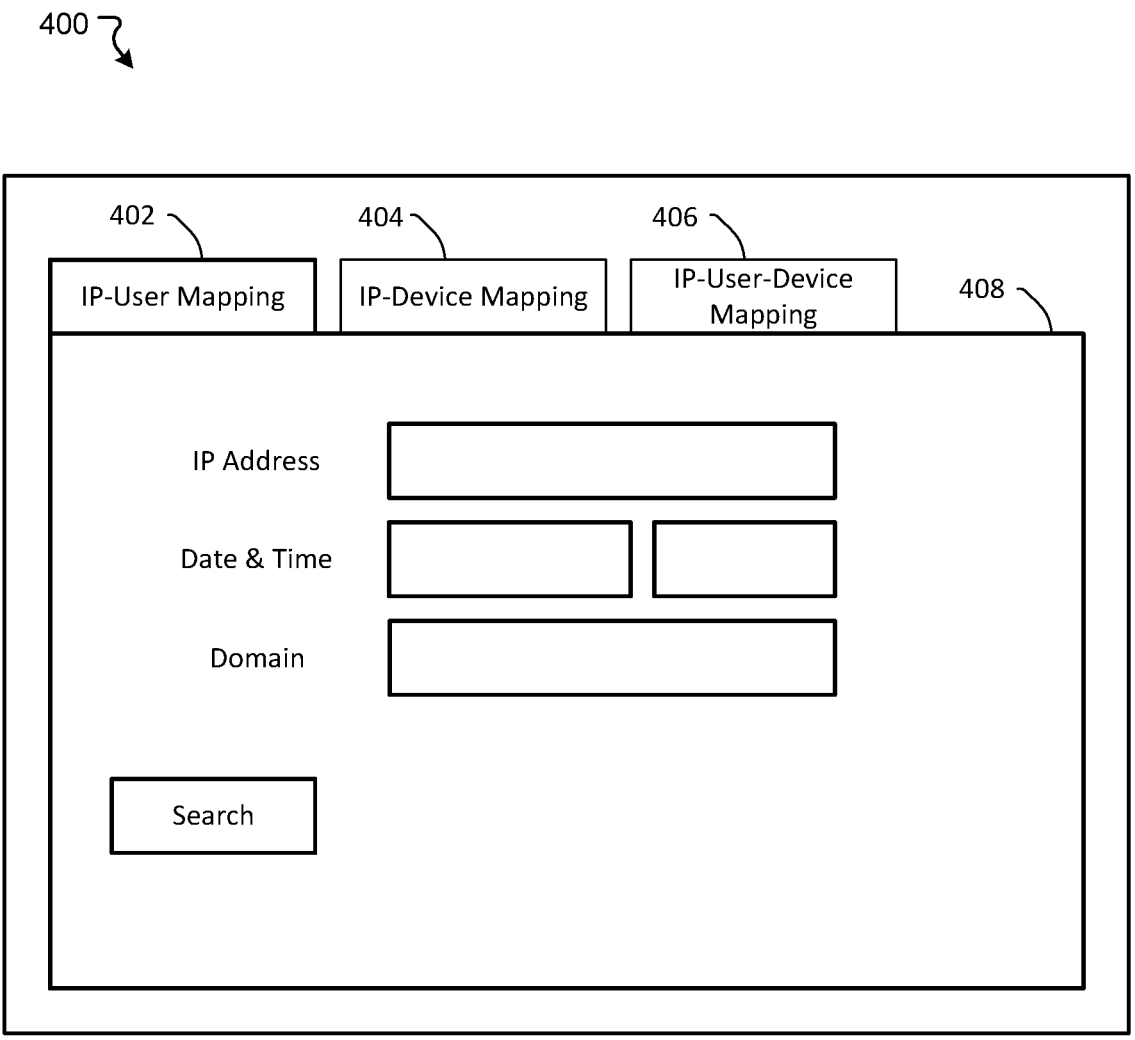
FIG. 4 illustrates an example of a graphical user interface (GUI) for searching near real-time IP user mapping according to some embodiments.

FIG. 4 illustrates an example of a graphical user interface (GUI) 400 for searching near real-time IP user mapping according to some embodiments. The GUI 400 illustrated in FIG. 4 includes an IP-user mapping tab 402, an IP-device mapping tab 404, an IP-user-device mapping tab 406, and a main tab screen 408. In some embodiments, the GUI 400 in FIG. 4 is one of GUIs viewable by an administrator of an internal network (e.g., the internal network 102a in FIG. 1).

In the example of FIG. 4, each of the IP-user mapping tab 402, the IP-device mapping tab 404, and the IP-user-device mapping tab 406 are selectable, and the example of FIG. 4 shows a screen when the IP-user mapping tab 402 is selected.

In the example of FIG. 4, the IP-user mapping tab 402 is configured to present the main tab screen 408 associated with the IP-user mapping tab 402, upon selection thereof. When the IP-user mapping tab 402 is selected, the main tab screen 408 presents a searching GUI for searching IP address assignment history of a specific IP address during a specific period of time. In the example of FIG. 4, the main tab screen 408 includes an input region for IP address(es), an input region for date and time, an input region for domain, and a selectable object to start searching. In some embodiments, when inputs are made to the input regions and the searching obtains a search result, a new GUI for presenting IP address assignment history (e.g., IP address mapping GUI) is presented. When the IP-user mapping tab 402 is selected, the IP address assignment history may include one or more subperiods during which a specific IP address has been assigned to one or more users identified by user name(s).

In the example of FIG. 4, the IP-device mapping tab 404 and the IP-user-device mapping tab 406 function in the similar or the same manner as the IP-user mapping tab 402. When the IP-device mapping tab 404 is selected, IP address assignment history may include one or more subperiods during which a specific IP address has been assigned to one or more user devices identified by device identifier(s) (e.g., MAC address). When the IP-user-device mapping tab 408 is selected, IP address assignment history may include one or more subperiods during which a specific IP address has been assigned to one or more users identified by user names and one or more user devices identified by device identifier(s).

FIG. 5 is a block diagram that illustrates a computer system 500 upon which any of the embodiments described herein may be implemented. Specifically, the system 500 enables the functional components of the user devices 104, the access points 106a and 106b, the AAA server 108, the service providers 110a and 110b, the IP mapping server 112, and/or the VPN user devices 114 depicted in FIG. 1 to function as described above. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method comprising:
    obtaining at least one first IP address assignment data point indicating a correspondence between an IP address and a first user identifier at a first point in time, wherein the at least one first IP address assignment data point is obtained from an authentication, authorization, and accounting (AAA) server of a private network;
    obtaining at least one second IP address assignment data point indicating a correspondence between the IP address and a second user identifier at a second point in time, wherein the at least one second IP address assignment data point is obtained from at least one device that has access to the private network;
    determining whether a conflict exists between the at least one first IP address assignment data point and the at least one second IP address assignment data point, wherein the conflict exists when the first point in time is within a predetermined period of time from the second point in time, and the first user identifier is different from the second user identifier;
    in response to determining the conflict exists, applying a priority criteria indicating that the at least one first IP address assignment data point is prioritized based on a rule that IP address assignment data points from the AAA server are prioritized over IP address assignment data points from other sources;
    based on the applying of the priority criteria, dropping the at least one second IP address assignment data point; and
    generating an IP address mapping based on non-dropped data points.

2. The method of claim 1, wherein the generating the IP address mapping based on non-dropped data points comprises:
    obtaining at least one third IP address assignment data point indicating a correspondence between the IP address and a third user identifier at a third point in time;
    dropping the at least one third IP address assignment data point when a conflict exists between the at least one third IP address assignment data point and either the at least one first IP address assignment data point or the at least one second IP address assignment data point; and
    generating the IP address mapping based on non-dropped data points.

3. The method of claim 1, wherein the first user identifier and the second user identifier include a user name of a user using a user device.

4. The method of claim 1, wherein the first user identifier and the second user identifier include a user device identifier of a user device.

5. The method of claim 1, wherein each of the non-dropped data points indicates a correspondence between the IP address and a user at a point in time, and the generating the IP address mapping based on non-dropped data points comprises:
    generating an IP address mapping rule indicating that the IP address has been assigned to the user for a corresponding period of time, the corresponding period of time comprising the shorter of: a predetermined period of time ending at the point in time and a period from the point in time back to a previous point in time indicated by another non-dropped data point.

6. A computing system, comprising one or more processors and one or more non-transitory computer-readable memories coupled to the one or more processors and configured with instructions executable by the one or more processors to cause the computing system to perform operations comprising:
   obtaining at least one first IP address assignment data point indicating a correspondence between an IP address and a first user identifier at a first point in time, wherein the at least one first IP address assignment data point is obtained from an authentication, authorization, and accounting (AAA) server of a private network;
   obtaining at least one second IP address assignment data point indicating a correspondence between the IP address and a second user identifier at a second point in time, wherein the at least one second IP address assignment data point is obtained from at least one device that has access to the private network;
   determining whether a conflict exists between the at least one first IP address assignment data point and the at least one second IP address assignment data point, wherein the conflict exists when the first point in time is within a predetermined period of time from the second point in time, and the first user identifier is different from the second user identifier;
   in response to determining the conflict exists, applying a priority criteria indicating that the at least one first IP address assignment data point is prioritized based on a rule that IP address assignment points from the AAA server are prioritized over IP address assignment data points from other sources;
   based on the applying of the priority criteria, dropping the at least one second IP address assignment data point; and
   generating an IP address mapping based on non-dropped data points.

7. The computing system of claim 6, wherein the generating the IP address mapping based on non-dropped data points comprises:
   obtaining at least one third IP address assignment data point indicating a correspondence between the IP address and a third user identifier at a third point in time;
   dropping the at least one third IP address assignment data point when a conflict exists between the at least one third IP address assignment data point and either the at least one first IP address assignment data point or the at least one second IP address assignment data point; and
   generating the IP address mapping based on non-dropped data points.

8. The computing system of claim 6, wherein the first user identifier and the second user identifier include a user name of a user using a user device.

9. The computing system of claim 6, wherein the first user identifier and the second user identifier include a user device identifier of a user device.

10. The computing system of claim 6, wherein each of the non-dropped data points indicates a correspondence between the IP address and a user at a point in time, and the generating the IP address mapping based on non-dropped data points comprises:
   generating an IP address mapping rule indicating that the IP address has been assigned to the user for a corresponding period of time, the corresponding period of time comprising the shorter of: a predetermined period of time ending at the point in time and a period from the point in time back to a previous point in time indicated by another non-dropped data point.

11. A non-transitory computer-readable storage medium configured with instructions executable by one or more processors to cause the one or more processors to perform operations comprising:
   obtaining at least one first IP address assignment data point indicating a correspondence between an IP address and a first user identifier at a first point in time, wherein the at least one first IP address assignment data point is obtained from an authentication, authorization, and accounting (AAA) server of a private network;
   obtaining at least one second IP address assignment data point indicating a correspondence between the IP address and a second user identifier at a second point in time, wherein the at least one second IP address assignment data point is obtained from at least one device that has access to the private network;
   determining whether a conflict exists between the at least one first IP address assignment data point and the at least one second IP address assignment data point, wherein the conflict exists when the first point in time is within a predetermined period of time from the second point in time, and the first user identifier is different from the second user identifier;
   in response to determining the conflict exists, applying a priority criteria indicating that the at least one first IP address assignment data point is prioritized based on a rule that IP address assignment data points from the AAA server are prioritized over IP address assignment data points from other sources;
   based on the applying of the priority criteria, dropping the at least one second IP address assignment data point; and
   generating an IP address mapping based on non-dropped data points.

12. The non-transitory computer-readable storage medium of claim 11, wherein each of the non-dropped data points indicates a correspondence between the IP address and a user at a point in time, and the generating the IP address mapping based on non-dropped data points comprises:
   generating an IP address mapping rule indicating that the IP address has been assigned to the user for a corresponding period of time, the corresponding period of time comprising the shorter of: a predetermined period of time ending at the point in time and a period from the point in time back to a previous point in time indicated by another non-dropped data point.

13. The non-transitory computer-readable storage medium of claim 11, wherein the generating the IP address mapping based on non-dropped data points comprises:
   obtaining at least one third IP address assignment data point indicating a correspondence between the IP address and a third user identifier at a third point in time;
   dropping the at least one third IP address assignment data point when a conflict exists between the at least one third IP address assignment data point and either the at least one first IP address assignment data point or the at least one second IP address assignment data point; and
   generating the IP address mapping based on non-dropped data points.

* * * * *